United States Patent
Dejneka et al.

(10) Patent No.: US 10,407,349 B2
(45) Date of Patent: Sep. 10, 2019

(54) BONDED ZIRCONIA REFRACTORIES AND METHODS FOR MAKING THE SAME

(71) Applicant: CORNING INCORPORATED, Corning, NY (US)

(72) Inventors: Matthew John Dejneka, Corning, NY (US); John Christopher Mauro, Boalsburg, PA (US); Mallanagouda Dyamanagouda Patil, Corning, NY (US); Kim Doreen Pierotti, Painted Post, NY (US); James Scott Sutherland, Corning, NY (US); Akenda Zellet-Lukaso, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/567,845

(22) PCT Filed: Apr. 21, 2016

(86) PCT No.: PCT/US2016/028532
§ 371 (c)(1),
(2) Date: Oct. 19, 2017

(87) PCT Pub. No.: WO2016/172274
PCT Pub. Date: Oct. 27, 2016

(65) Prior Publication Data
US 2018/0105470 A1    Apr. 19, 2018

Related U.S. Application Data

(60) Provisional application No. 62/152,458, filed on Apr. 24, 2015.

(51) Int. Cl.
*C04B 35/482*    (2006.01)
*C04B 35/64*    (2006.01)
(Continued)

(52) U.S. Cl.
CPC .......... *C04B 35/4885* (2013.01); *C03C 14/00* (2013.01); *C04B 35/482* (2013.01);
(Continued)

(58) Field of Classification Search
CPC .................................................... C04B 35/482
(Continued)

(56) References Cited

U.S. PATENT DOCUMENTS

| 4,053,321 A | 10/1977 | Okumiya et al. |
| 4,290,814 A | 9/1981 | Pavlica et al. |

(Continued)

FOREIGN PATENT DOCUMENTS

| CN | 101928142 A | 12/2010 |
| CN | 101928143 A | 12/2010 |

(Continued)

OTHER PUBLICATIONS

Aksel et al; "The Influence of Zircon in a Model Aluminosilicate Glass Tank Forehearth Refractory"; Journal of the European Ceramic Society, 23 (2003), 2083-2088.
(Continued)

*Primary Examiner* — Karl E Group
(74) *Attorney, Agent, or Firm* — Ryan T. Hardee (57) ABSTRACT

Disclosed herein are methods for making a bonded refractory material, the methods comprising preparing a slurry comprising glass precursor particles having an average particle size ranging from about 1 nm to about 200 nm; combining zirconia particles with the slurry to form a batch composition comprising at least about 80% by weight of zirconia; forming a green body from the batch composition; and sintering the green body to form a sintered refractory material. Sintered high-zirconia refractory materials can comprise at least about 80% by weight of zirconia having an average grain size of 100 microns or less, wherein the
(Continued)

zirconia is interspersed in a glassy phase, and wherein the sintered refractory materials comprise about 15% or less by weight of the glassy phase. Melting vessels having at least one interior surface comprising such sintered zirconia refractory materials are further disclosed herein.

7 Claims, 5 Drawing Sheets

(51) Int. Cl.
    *F27D 1/00*     (2006.01)
    *C04B 35/488*     (2006.01)
    *C04B 35/486*     (2006.01)
    *C03C 14/00*     (2006.01)
    *C03B 5/43*     (2006.01)

(52) U.S. Cl.
    CPC ............ *C04B 35/486* (2013.01); *C04B 35/64* (2013.01); *F27D 1/0006* (2013.01); *C03B 5/43* (2013.01); *C04B 2235/3201* (2013.01); *C04B 2235/3205* (2013.01); *C04B 2235/3217* (2013.01); *C04B 2235/3218* (2013.01); *C04B 2235/3232* (2013.01); *C04B 2235/3244* (2013.01); *C04B 2235/34* (2013.01); *C04B 2235/3409* (2013.01); *C04B 2235/3418* (2013.01); *C04B 2235/36* (2013.01); *C04B 2235/365* (2013.01); *C04B 2235/5436* (2013.01); *C04B 2235/5445* (2013.01); *C04B 2235/5454* (2013.01); *C04B 2235/602* (2013.01); *C04B 2235/604* (2013.01); *C04B 2235/606* (2013.01); *C04B 2235/6562* (2013.01); *C04B 2235/6565* (2013.01); *C04B 2235/661* (2013.01); *C04B 2235/80* (2013.01); *C04B 2235/9669* (2013.01); *C04B 2235/9676* (2013.01)

(58) Field of Classification Search
    USPC .................................................. 501/103–105
    See application file for complete search history.

(56) References Cited

U.S. PATENT DOCUMENTS

| | | | |
|---|---|---|---|
| 4,579,829 A | 4/1986 | Garvie | |
| 4,687,749 A | 8/1987 | Beall | |
| 5,154,785 A | 10/1992 | Tabata et al. | |
| 5,656,564 A * | 8/1997 | Nakayama | C04B 35/488 433/8 |
| 6,121,177 A * | 9/2000 | Guigonis | C03B 5/43 501/105 |
| 6,165,594 A | 12/2000 | Moh et al. | |
| 6,746,528 B1 | 6/2004 | Horton et al. | |
| 7,910,508 B2 * | 3/2011 | Gaubil | C03B 5/43 501/106 |
| 8,268,742 B2 * | 9/2012 | Sato | C03B 5/43 501/104 |
| 8,273,673 B2 | 9/2012 | Cabodi et al. | |
| 8,288,300 B2 | 10/2012 | Cabodi et al. | |
| 8,563,453 B2 | 10/2013 | Tomura et al. | |
| 8,642,492 B2 | 2/2014 | Tomura et al. | |
| 8,987,157 B2 * | 3/2015 | Ito | C01G 25/02 501/103 |
| 9,242,903 B2 | 1/2016 | Tomura et al. | |
| 9,302,943 B2 | 4/2016 | Gaubil et al. | |
| 2007/0179041 A1 | 8/2007 | Muroi et al. | |
| 2007/0249481 A1 | 10/2007 | Gupta et al. | |
| 2009/0176642 A1 | 7/2009 | Tomura et al. | |
| 2009/0317767 A1 * | 12/2009 | Burger | C04B 35/4885 433/201.1 |
| 2010/0003630 A1 * | 1/2010 | Yamashita | B82Y 30/00 433/8 |
| 2010/0240519 A1 * | 9/2010 | Nakasuga | C01G 53/006 501/105 |
| 2010/0292068 A1 | 11/2010 | Takaya et al. | |
| 2011/0107796 A1 * | 5/2011 | Citti | C03B 5/43 65/134.1 |
| 2012/0036895 A1 * | 2/2012 | Sato | C03B 5/43 65/374.13 |
| 2012/0178612 A1 | 7/2012 | Takaya et al. | |
| 2014/0196504 A1 * | 7/2014 | Cabodi | C03B 5/43 65/374.13 |
| 2016/0023955 A1 * | 1/2016 | Kuboki | C03B 5/43 501/104 |

FOREIGN PATENT DOCUMENTS

| | | | | |
|---|---|---|---|---|
| CN | 102503489 A | 6/2012 | | |
| CN | 102701737 A | 10/2012 | | |
| EP | 414558 A1 | 2/1991 | | |
| EP | 1810956 A1 * | 7/2007 | ........... | C04B 35/481 |
| GB | 2065632 A | 7/1981 | | |
| GB | 2283486 A | 5/1995 | | |
| JP | 48080610 A | 10/1973 | | |
| JP | 49096005 A | 9/1974 | | |
| JP | 51050924 A | 5/1976 | | |
| JP | 53121012 A | 10/1978 | | |
| JP | 56073672 A | 6/1981 | | |
| JP | 59203772 A | 11/1984 | | |
| JP | 60051663 A | 3/1985 | | |
| JP | 62260776 A | 11/1987 | | |
| JP | 63182281 A | 7/1988 | | |
| JP | 63285173 A | 11/1988 | | |
| JP | 64051369 A | 2/1989 | | |
| JP | 1100068 A | 4/1989 | | |
| JP | 1212235 A | 8/1989 | | |
| JP | 3197356 A | 8/1991 | | |
| JP | 3208869 A | 9/1991 | | |
| JP | 4193766 A | 7/1992 | | |
| JP | 5117021 A | 5/1993 | | |
| JP | 6183832 A | 7/1994 | | |
| JP | 6345532 A | 12/1994 | | |
| JP | 7097259 A | 4/1995 | | |
| JP | 11130529 A | 5/1995 | | |
| JP | 8059345 A | 3/1996 | | |
| JP | 8175878 A | 7/1996 | | |
| JP | 10059768 A | 3/1998 | | |
| JP | 2000302560 A | 10/2000 | | |
| JP | 2001080960 A | 3/2001 | | |
| JP | 2003089582 A | 3/2003 | | |
| JP | 2004142980 A | 5/2004 | | |
| JP | 2004149348 A | 5/2004 | | |
| JP | 2005298277 A | 10/2005 | | |
| JP | 2007176736 A | 7/2007 | | |
| JP | 2008007358 A | 1/2008 | | |
| KR | 2002016130 A | 3/2002 | | |
| SU | 472921 A1 | 6/1975 | | |
| WO | 2013151107 A1 | 10/2013 | | |

OTHER PUBLICATIONS

Beck et al; "Investigation of Cat Scratches on Container Glass"; Galstech. Ber. Glass Sci. Technol. 74 (2001) No. 4; pp. 77-85.
"Boggum et al; ""Properties of Walls and Roofs in Glassmelting Furnaces"". [Seitenwaende Und Gewoelbe Vonglasschmelzwannen.](1977) Glastech Ber, 50 (8), pp. 176-180.".
Busby; "How Are Superstructure Refractories Meeting Today's Challenges? A Review of Factors Affecting Usage Practices in Glass-Melting Furnaces"; Glass Industry; Mar. 1990, pp. 31-35.
Dunkl; "Boundary Layers Refractory/Glass Melt and Glass Defects"; Advanced Materials Research, vol. 39-40 pp. 601-606, 2008.
Guzman et al; "Corrosion-Erosion Wear of Refractory Bricks in Glass Furnaces"; Engineering Failure Analysis, 46 (2014) 188-195.
Internation Search Report and Written Opinion of the International Searching Authority; PCT/US2016/028532; dated Sep. 28, 2016; 14 pages; European Patent Office.

(56) References Cited

OTHER PUBLICATIONS

Patapy et al; "Characterization by Acoustic Emission Pattern Recognition of Microstructure Evolution in a Fused-Cast Refractory During High Temperature Cycling"; Journal of the European Ceramic Society, 30 (2010) 3093-3101.
Pavlik Jr. et al; "Thermal Decomposition of Zircon Refracotries"; J. Am. Ceram. Soc., 84 [12] 2930-36 (2001).
Smith; "Electrical Conduction of Selected Refractories"; Industry Applications Society Annual Meeting, 1989, Conference Record of the 1989 IEEE, Oct. 1-5, 1989.

* cited by examiner

BONDED ZIRCONIA REFRACTORIES AND METHODS FOR MAKING THE SAME

CROSS-REFERENCE TO RELATED APPLICATIONS

This application claims the benefit of priority under 35 U.S.C. § 119 of International Patent Application Serial No. PCT/US16/28532, filed on Apr. 21, 2016, which in turn, claims the benefit of priority of U.S. Provisional Patent Application Ser. No. 62/152,458 filed on Apr. 24, 2015, the content of which is relied upon and incorporated herein by reference in its entirety.

FIELD OF THE DISCLOSURE

The present disclosure relates generally to refractory materials and methods for making the same, and more particularly to bonded high-zirconia refractory materials comprising a fine grain microstructure and a dispersed glassy phase.

BACKGROUND

Melting furnaces and vessels can be used to melt a wide variety of batch materials, such as glass and metal batch materials, to name a few. Batch materials can be placed in a vessel having two or more electrodes and melted by applying voltage to the electrodes and/or by applying an external heat source, such as a burner. The life cycle of a melting furnace can depend, e.g., on wear of the refractory materials from which the vessel is constructed. For instance, during the melting process, the vessel walls can be gradually worn down due to contact with the molten batch materials. Refractory materials used to construct the walls, bottom, and/or top of the vessel should thus exhibit high corrosion resistance, low thermal conductivity, high electric resistivity, and/or high mechanical strength to survive the rigorous temperatures and other conditions associated with processing molten materials.

Wear of the refractory material during the melting process not only poses a safety risk in terms of creating leakage pathways that can comprise the operational safety of the equipment, but can also contaminate the batch materials. For instance, if a piece of the refractory wall breaks off into the melt, it may result in an unacceptable impurity or inclusion defect in the final product. It can therefore be important to manufacture refractory materials, such as zirconia, for the construction of melting vessels and other high-temperature equipment that can withstand processing rigors for extended periods of time without compromising operational safety and/or product quality. However, refractory blocks used to manufacture such melting vessels can be relatively large (e.g., about 20-25 cm thick, about 30-60 cm wide, about 120-140 cm long) and/or heavy (e.g., about 300-400 kg for a 20 cm×30 cm×120 cm block or about 1000-1100 kg for a 25 cm×60 cm×140 cm block), which can complicate the manufacturing process from a scalability and/or process management standpoint.

One conventional process for forming refractory blocks is fused casting, in which batch materials are melted (e.g., in an arc furnace with graphite electrodes) and the melt is poured into a crucible (e.g., a graphite crucible), followed by a controlled cooling cycle. Refractories produced by such processes can be exposed to reducing atmospheres (e.g., due to graphite electrodes and/or crucibles), which may result in reduced species in the material such as graphite, zirconium carbide, and/or zirconia metal, and/or voids due to oxygen vacancies in the material. Reduced species within the refractory can result in a refractory product that is substantially gray in color, but which can turn to a cream to light brownish color as the refractory changes oxidation states during use.

Fused cast high-zirconia refractories can be expensive to manufacture and/or can have various drawbacks such as stoning and/or significant yield loss, particularly within the first few months of process start-up. During the cooling cycle used in the fuse casting process, voids and/or porosity can form at the center of the refractory material due to organic burnoff and/or reduction reactions. Thus, there may be variations in the crystal size and/or glassy composition across the thickness of the material and/or at the surface as compared to the center. In some instances, the grain size can increase from relatively smaller at the surface to relatively larger at the center. These fused cast refractories, such as zirconia, can also comprise fairly large grains (e.g., about 100-1000 microns), which may pose a problem if they detach from the surface. Larger zirconia grains or pieces of refractory can break off into the melt and result in an impurity and/or inclusion defect in the final product.

Currently, to Applicant's knowledge, sintered high-zirconia refractory materials suitable for constructing melting vessels have not been contemplated or made available. This may be due, at least in part, to various difficulties in managing the manufacturing process, such as phase changes brought on by elevated temperatures, which can cause stress and/or significant volume changes within the refractory material. For example, zirconia can undergo a change in crystal structure around 1170° C. from a monoclinic to a tetragonal structure. Such crystal structure changes can be associated with significant volume changes (e.g., as high as about 4%), which can make it difficult to manage the manufacturing process, particularly for large-scale applications, and/or can add stress to the refractory parts during use at elevated temperatures. Bonded (sintered) alumina-zirconia-silica (AZS) refractories may be available as materials for constructing melting vessels; however, such AZS materials typically comprise less than about 40 wt % zirconia in the composition, and thus exhibit lower resistance to corrosion (e.g., from molten glass and/or metal) as compared to high-zirconia refractories (e.g., greater than about 80 wt % zirconia).

Accordingly, it would be advantageous to provide refractory materials that can withstand high temperatures and/or corrosive conditions for extended periods of time without compromising safety and/or product quality. It would be also be advantageous to provide methods for producing such refractories that have reduced cost and/or complexity. Moreover, it would be advantageous to provide methods for forming large refractory shapes, such as blocks, which can have dimensions suitable for constructing large-scale equipment.

SUMMARY

The disclosure relates to methods for making a bonded or sintered refractory material, the methods comprising preparing a slurry comprising glass precursor particles having an average particle size ranging from about 1 nm to about 200 nm; combining zirconia particles with the slurry to form a batch composition comprising at least about 80% by weight of zirconia; forming a green body from the batch composition; and sintering the green body to form a sintered refractory material. According to various embodiments, the zirconia particles can have an average particle size ranging from about 1 µm to about 20 µm, and can make up greater than 80% by weight of the batch composition. In additional embodiments, the glass precursor particles can be chosen from alumina, silica, boron oxide, alkali and alkaline earth metal oxides, titania, phosphorous oxide, and combinations thereof, and can make up about 20% or less by weight of the batch composition. Sintered zirconia refractory materials made according to these methods are also disclosed herein. Sintered high-zirconia refractory materials can comprise at least about 80% by weight of zirconia having an average grain size of 100 microns or less, wherein the zirconia is interspersed in a glassy phase, and wherein the sintered refractory materials comprise about 20% or less by weight of the glassy phase. Sintered refractory materials disclosed herein can also have a substantially homogenous grain microstructure and/or grain distribution. Melting vessels having at least one interior surface comprising such sintered zirconia refractory materials are further disclosed herein.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals where possible and in which.

DETAILED DESCRIPTION

Disclosed herein are methods for making a bonded or sintered refractory material, the methods comprising preparing a slurry comprising glass precursor particles having an average particle size ranging from about 1 nm to about 200 nm; combining zirconia particles with the slurry to form a batch composition comprising at least about 80% by weight of zirconia; forming a green body from the batch composition; and sintering the green body to form a bonded refractory material.

Figure 1:
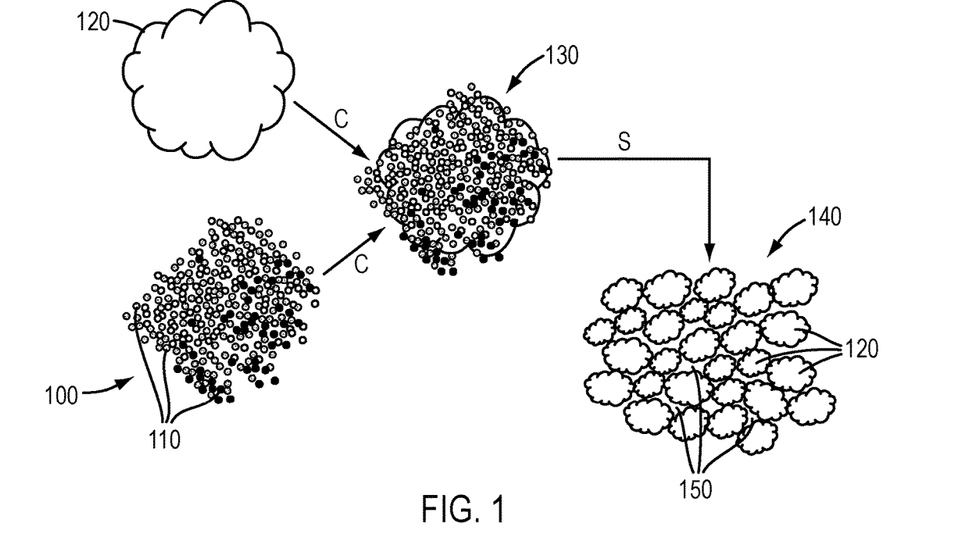
FIG. 1 is a schematic illustrating an exemplary method for forming a bonded refractory material according to certain embodiments of the disclosure.

Embodiments of the disclosure will be discussed with reference to FIG. 1, which depicts an exemplary method for making a bonded refractory material according to various embodiments of the disclosure. The following general description is intended to provide an overview of the claimed method and various aspects will be more specifically discussed throughout the disclosure with reference to the non-limiting embodiments, these embodiments being interchangeable with one another within the context of the disclosure. According to one exemplary embodiment, a slurry 100 comprising glass precursor particles 110 can be prepared and combined in step C with refractory particles (e.g., zirconia) 120 to form a batch composition 130. The batch composition 130, as shown in FIG. 1, can comprise refractory particles 120 coated with glass precursor particles 110, for instance, the relatively larger refractory particles can be dispersed in the slurry comprising the relatively smaller glass precursor particles and, in some embodiments, the batch composition can comprise a matrix of interspersed refractory and glass precursor particles. The batch composition can be formed into a green body and sintered in step S to form a bonded refractory material 140 comprising a glassy phase 150.

As used herein, the terms "bonded" and "sintered" are used interchangeably to refer to a refractory material which is first cast as a green body comprising individual particles which are merged together into larger grains by heating the green body to a sintering temperature. In contrast, "fused cast" materials are produced by first melting the batch materials to form molten batch materials and subsequently casting the molten materials into a shape and cooling it.

Figure 2A:
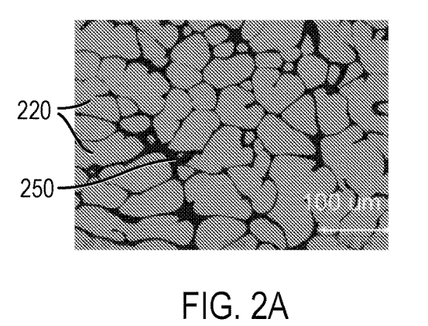
FIGS. 2A-B depict cross-sectional SEM images of the microstructure of a fused cast zirconia refractory material.
Figure 2B:
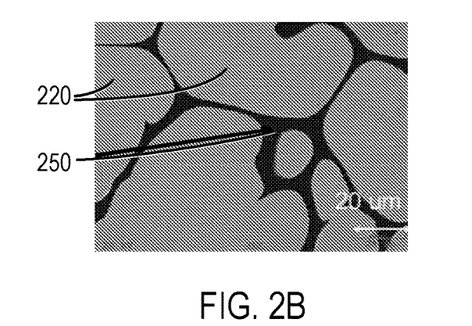

FIGS. 2A-B are scanning electron microscope (SEM) images of cross-sections of fused cast zirconia made according to prior art processes (100 micron and 20 micron scale magnification, respectively). As can be appreciated from the images, the zirconia grains 220 are separated by a glass phase 250. In some instances, fused cast refractories can comprise about 5-15% by weight of a glassy phase to accommodate stress on the material during crystal phase changes. The average grain size for zirconia thus produced can be relatively large, such as ranging from about 100 microns to about 1000 microns, and can vary throughout the material, e.g., with pockets of smaller grains in one location and pockets of larger grains in another location. Current standards for glass processing define a defect as any inclusion >100 microns. Thus, zirconia grains that may break off from a fused cast refractory block and become entrained in the melt can most likely result in a defect-level inclusion in the resulting glass product. For more stringent defect standards, such as >50 micron inclusions, the product yield loss due to defect-level inclusions for glass made using fused cast refractory vessels can be even higher.

Figure 3:
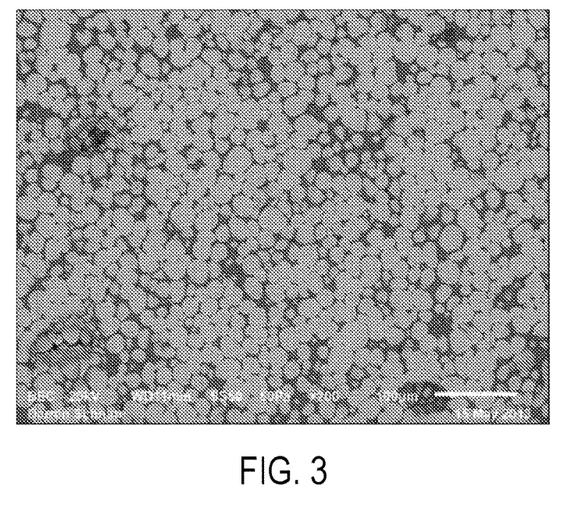
FIG. 3 depicts a cross-sectional SEM image of an exemplary bonded zirconia produced according to embodiments of the disclosure.
Figure 4A:
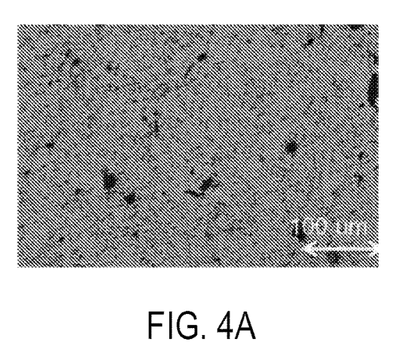
FIGS. 4A-B depict cross-sectional SEM images of an exemplary bonded zirconia produced according to embodiments of the disclosure.
Figure 4B:
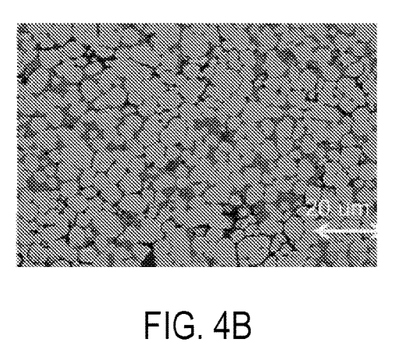

Referring to FIGS. 3 and 4A-B, which are cross-sectional SEM images of bonded zirconia made according to various embodiments disclosed herein, it can be appreciated that the microstructure of the bonded zirconia is different from that of the fused cast zirconia. In particular, the grain size for the bonded zirconia is much smaller, e.g., on the order of about 100 microns or less, such as from about 5 to about 90 microns, from about 10 to about 80 microns, from about 20 to about 70 microns, from about 30 to about 60 microns, or from about 40 to about 50 microns, including all ranges and subranges therebetween. Bonded zirconia refractory with finer grain size can be advantageous in terms of a lower product defect rate because smaller zirconia grains can dissolve more effectively in a glass melt or, if not completely dissolved, can result in inclusions that may be below the defect threshold. An additional advantage may include a more uniform microstructure (as shown in FIGS. 3 and 4A-B) throughout the refractory body from one end to the other as compared to a variable grain distribution observed in fused cast zirconia.

Sintered high-zirconia refractory materials can be produced herein using nanoscale glassy precursor particles, which may uniformly cover the surface of fine microscale zirconia particles. The uniform distribution and coating of the nanoscale glass precursors can result in the formation of an in-situ glass phase between the zirconia grains during the sintering process. Further benefits can be obtained by managing the zirconia crystal phase transition during the heating and cooling cycles to mitigate the effect of volume changes on grain size and/or uniformity.

The term "glass precursor materials" and variations thereof are used herein to denote a mixture of precursor components which, upon melting, react and/or combine to form a glass or glassy phase. The glass precursor materials may be prepared and/or mixed by any known method for combining precursor materials. For example, in certain non-limiting embodiments, the glass precursor materials can comprise a dry or substantially dry mixture of precursor particles, e.g., without any solvent or liquid. The glass precursor materials may be mixed with at least one solvent to form a slurry, for example, a mixture of precursor particles in the presence of a liquid or solvent.

According to various embodiments, the glass precursor materials may comprise silica, alumina, and various additional compounds and/or oxides, such as boron, tin, titanium, or phosphorous oxides and alkali or alkaline earth metal compounds (e.g., salts and/or oxides). For instance, the glass batch materials may be a mixture of silica and/or alumina with one or more additional components such as additional oxides (e.g., boron oxide, tin, titania, phosphorous oxide) and alkali or alkaline earth metal compounds (e.g., compounds comprising Na, K, Ca, Mg, Sr, etc.). In various embodiments, the glass batch materials can comprise from about 80% to about 100% by weight collectively of alumina and/or silica and from about 0% to about 20% by weight collectively of the at least one additional component. For example, the glass precursor particles can comprise from about 80% to about 100% by weight collectively of alumina and/or silica, such as from about 85% to about 99%, from about 90% to about 98%, or from about 92% to about 95% by weight collectively of silica and/or alumina, including all ranges and subranges therebetween. Similarly, the glass precursor particles can comprise from about 0% to about 20% by weight collectively of at least one additional component, such as from about 1% to about 15%, from about 2% to about 10%, or from about 5% to about 8% by weight collectively of at least one additional oxide, including all ranges and subranges therebetween.

In certain embodiments, the glass precursor particles can comprise from about 50% to about 95% by weight of silica, such as about 55%, 60%, 65%, 70%, 75%, 80%, 85%, 90%, or 95% by weight of silica, including all ranges and subranges therebetween. According to additional embodiments, the glass precursor particles can comprise from about 50% to about 95% by weight of alumina, such as about 55%, 60%, 65%, 70%, 75%, 80%, 85%, 90%, or 95% by weight of alumina, including all ranges and subranges therebetween. In further embodiments, the glass precursor particles may comprise from about 3% to about 15% by weight of boron oxide, such as from about 5% to about 12%, or from about 8% to about 10% by weight of boron oxide, including all ranges and subranges therebetween. According to yet further embodiments, the glass precursor particles may comprise from about 1% to about 10% by weight of alkali or alkaline earth metal compounds, such as from about 2% to about 9%, from about 3% to about 8%, from about 4% to about 7%, or from about 5% to about 6% by weight of such compounds, including all ranges and subranges therebetween. Similarly, other oxides such as tin, titanium, or phosphorous oxides can be present in an amount ranging from about 1% to about 10% by weight, including the ranges and subranges indicated above.

According to non-limiting embodiments, the glass precursor particles can have a nanoscale average particle size. For instance, the average particle size can be less than or equal to about 200 nm, such as ranging from about 1 nm to about 10 nm, from about 2 nm to about 9 nm, from about 3 nm to about 8 nm, from about 4 nm to about 7 nm, or from about 5 nm to about 6 nm, including all ranges and subranges therebetween. In other embodiments, the average particle size can range from about 5 nm to about 190 nm, from about 10 nm to about 180 nm, from about 20 nm to about 170 nm, from about 30 nm to about 160 nm, from about 40 nm to about 150 nm, from about 50 nm to about 140 nm, from about 60 nm to about 130 nm, from about 70 nm to about 120 nm, from about 80 nm to about 110 nm, or from about 90 nm to about 100 nm, including all ranges and subranges therebetween. According to various embodiments, the silica and/or alumina can have a particle size ranging from about 1 nm to about 5 nm, such as from about 2 nm to about 4 nm, including all ranges and subranges therebetween. Likewise, the average particle size of the additional oxide (such as, e.g., boron oxide, titania, etc.) can range from about 1 nm to about 5 nm, such as from about 2 nm to about 4 nm, including all ranges and subranges therebetween. The average particle size of the alkali or alkaline earth metal compounds, if present, can range, in some embodiments, from about 2 nm to about 100 nm, such as from about 5 nm to about 50 nm, or from about 20 nm to about 30 nm, including all ranges and subranges therebetween.

It is to be understood that the particle size of the glass precursor particles is measured in the slurry, e.g., after addition to the solvent. Thus, glass precursor particles larger than 200 nm can be mixed with a solvent to produce particles having an average size of less than 200 nm in the slurry. Moreover, it is to be understood that the slurry can comprise glass precursor particles larger than 200 nm in some embodiments, such as a mixture of precursor particles that are both less than or equal to 200 nm or greater than 200 nm.

The slurry 100 can be prepared by mixing the glass precursor materials with at least one solvent. Non-limiting examples of suitable solvents include, for example, water, deionized water, alcohols such as ethanol, and combinations thereof. The slurry can comprise, in various embodiments, from about 5% to about 30% by weight of the at least one solvent, such as from about 10% to about 25%, from about 12% to about 20%, or from about 15% to about 18% by weight of the at least one solvent, including all ranges and subranges therebetween. In certain embodiments, the slurry can comprise at least one additive, such as a buffers, dispersants, surfactants, and combinations thereof. The at least one additive can be present in the slurry in an amount ranging, for example, from about 0.01% to about 10% by weight, such as from about 0.1% to about 5%, or from about 0.5% to about 1% by weight, including all ranges and subranges therebetween.

In some embodiments, the pH of the slurry can be modified to a desired value by adding at least one buffer to the slurry. For instance, the pH of the slurry can be adjusted to reduce or overcome van der Waals attractive forces between the particles and thus prevent or reduce the formation of agglomerates and/or reduce the viscosity of the slurry. The pH adjustment can be carried out, e.g., by the addition of either an acid or base as a buffer. For example, the slurry can be treated with an acidic buffer, such as an inorganic acid including hydrochloric acid, sulfuric acid, and nitric acid, to name a few, and carboxylic acids, such as acetic acid and propionic acid, as well as basic buffers, including alkali hydroxides (e.g., NaOH, KOH, LiOH), aqueous ammonia, and organic amines (e.g., ethanolamine). The pH of the slurry can, for example, be adjusted to a value ranging from about 3 to about 12, such as from about 4 to about 11, from about 5 to about 10, from about 6 to about 9, or from about 7 to about 8, including all ranges and subranges therebetween. For instance, the pH of the slurry can be modified to a value ranging from about 3 to about 6 or from about 8 to about 12.

The glass precursor materials 110 can be pre-mixed as dry batch components and added together to the solvent, or vice versa. Alternatively, the precursor materials can be added individually to the solvent with or without mixing in between additions. In additional embodiments, a slurry can be created with one or more oxides and one or more solvents, followed by addition of one or more additional solvents and/or oxides to the slurry, with mixing before, during, and/or after each addition. Of course, any other order or variation can be used and is envisioned as falling within the scope of the disclosure. According to certain embodiments, alumina can be added to at least one solvent, followed by silica, followed by at least one additional component, such as boron oxide. Mixing can take place during addition of the oxides to the solvent, after addition of the precursor materials to the solvent, and/or in between individual additions to the mixture. Mixing times for the slurry can vary depending on the materials and can range, for example, from about 1 minute to about 30 minutes, such as from about 2 minutes to about 25 minutes, from about 3 minutes to about 20 minutes, from about 4 minutes to about 15 minutes, or from about 5 minutes to about 10 minutes, including all ranges and subranges therebetween.

The slurry 100 can be combined with the refractory particles 120 to form a batch composition 130 according to any method known in the art. For instance, the refractory particles can be added to the slurry, or vice versa, and mixed. Mixing times for the batch composition can vary depending on the materials and can range, for example, from about 1 minute to about 30 minutes, such as from about 2 minutes to about 25 minutes, from about 3 minutes to about 20 minutes, from about 4 minutes to about 15 minutes, or from about 5 minutes to about 10 minutes, including all ranges and subranges therebetween. In various non-limiting embodiments, the refractory particles can be zirconia particles. The refractory particles can, in some embodiments, include refractories other than zirconia, such as particles chosen from, alumina, silica, and combinations thereof. The refractory particles can have an average particle size larger than that of the glass precursor materials, e.g., a microscale size. Suitable particle sizes can include, for example, about 20 microns or less, such as from about 1 to about 20 microns, from about 2 to about 19 microns, from about 3 to about 18 microns, from about 4 to about 17 microns, from about 5 to about 16 microns, from about 6 to about 15 microns, from about 7 to about 14 microns, from about 8 to about 13 microns, from about 9 to about 12 microns, or from about 10 to about 11 microns, including all ranges and subranges therebetween. In certain embodiments, the refractory particle size can be greater than 10 microns, such as 15, 20, 25, 30, 35, 40, 45, or 50 microns, or even up to 100 microns, including all ranges and subranges therebetween.

The overall batch composition can comprise, in non-limiting embodiments, at least about 80% by weight of refractory particles, such as at least about 85%, at least about 90%, at least about 92%, at least about 95%, at least about 96%, at least about 97%, at least about 98%, or at least about 99% by weight of refractory particles, including all ranges and subranges therebetween. Refractory materials produced using such concentrations may be referred to as "high-refractory" materials, e.g., a zirconia refractory comprising at least about 80% by weight of zirconia can be referred to as a "high-zirconia" refractory material, and so on. In certain embodiments, the overall batch composition can comprise from about 80% to about 96% by weight of zirconia. The overall batch composition can comprise from about 5% to about 20% by weight of the slurry, such as from about 8% to about 15%, or from about 10% to about 12% by weight of the slurry, including all ranges and subranges therebetween. As such, the overall batch composition can comprise from about 3% to about 15% by weight of glass precursor particles, such as from about 5% to about 12%, or from about 8% to about 10% by weight of glass precursor particles (e.g., about 3, 4, 5, 6, 7, 8 9, 10, 11, 12, 13, 14, or 15%), including all ranges and subranges therebetween. The glassy phase can likewise comprise up to about 20% of the resulting refractory material.

In certain embodiments, the batch composition can comprise at least one additive, for instance, a binding and/or dispersing and/or mixing aid. For example, the batch composition can comprise at least one organic or inorganic binder or at least one plasticizer. Such additives can be present in the overall batch composition in an amount ranging, for instance, from about 0.01% to about 10% by weight, such as from about 0.1% to about 5% by weight, or from about 0.5% to about 1% by weight, including all ranges and subranges therebetween. In some embodiments, the batch composition can be free of such additives, e.g., consisting essentially of refractory particles, glass precursor particles, and solvent. According to various embodiments, the batch composition can be free or substantially free of organic or inorganic binders, or can comprise less than about 1% by weight of such binders, such as less than about 0.1%, or less than about 0.01% by weight of such binders. Without wishing to be bound by theory, it is believed that the use of little or no binders and/or other organic compounds can reduce or eliminate any complications resulting from their burn off during the sintering process.

After mixing, the batch composition can be formed into a green body according to various methods available in the art. For example, the batch composition can be placed in a mold and cast into any desired shape, such as a bar, slab, brick, or cube, to name a few non-limiting shapes. According to various embodiments, the cast green body can be dried, e.g., in air or in an oven or other heating device at approximately room temperature or at an elevated temperature, such as from about 40° C. to about 200° C., from about 50° C. to about 150° C., from about 60° C. to about 120° C., from about 70° C. to about 100° C., or from about 80° C. to about 90° C., including all ranges and subranges therebetween. The dried green body can then be sintered according to any appropriate method and using any desired thermal cycle.

Other methods for forming a green body from the batch composition can comprise drying the batch composition, e.g., at approximately room temperature or at an elevated temperature, such as from about 40° C. to about 200° C., from about 50° C. to about 150° C., from 60° C. to about 120° C., from 70° C. to about 100° C., or from about 80° C. to about 90° C., including all ranges and subranges therebetween. The dried composition can then be powdered, for example, by pulverization or any other suitable technique, to form a powdered composition. The powdered particles can have an average particle size ranging from about 1 to 100 microns, such as from about 5 to about 90 microns, from about 10 to about 80 microns, from about 20 to about 70 microns, from about 30 to about 60 microns, or from about 40 to about 50 microns, including all ranges and subranges therebetween. In some embodiments, the powdered particles may be sifted through a sieve to exclude larger particle sizes, e.g., particles having a diameter greater than 100 microns, or to achieve any other desired target size range. The powdered particles can then be pressed into various shapes, e.g., using a uniaxial or isostatic press.

If additional support for the green body (cast or pressed) is desired, it may be possible to cast or press the green body onto a tray comprising a refractory material, such as alumina or another suitable refractory. The cast or pressed body can also be transferred to the refractory tray after formation. The tray can, in some embodiments, provide mechanical support to the green body, which may otherwise be susceptible to deformation (e.g., sagging) during handling and/or transport to the sintering furnace. In some embodiments, the tray may be coated with a layer of refractory powder having a composition similar to that of the green body (such as a zirconia powder). During sintering, a sacrificial layer may form on the surface of the green body in contact with the tray, for example, a layer having a composition different from the overall composition of the refractory article. This layer can, in certain embodiments, be removed prior to the end use of the refractory material.

When constructing large-scale vessels from refractory materials, it may be necessary to assemble several larger pieces of refractory material, such as bricks or rods. However, handling and processing large green bodies can be challenging due to their large mass and low green strength (e.g., as low as 80 psi, 5.624 kg/cm$^2$). By directly casting or pressing the shapes onto a refractory tray as described above, it may be easier to move the tray and green body into a furnace for sintering without deforming the green body. Alternatively, prior to sintering in the furnace, the green body may be partially heat-treated, e.g., to a temperature ranging from about 400° C. to about 1000° C., such as from about 500° C. to about 900° C., from about 600° C. to about 700° C., or about 800° C., including all ranges and subranges therebetween, which can raise the green strength significantly. In some instances, heat-treating the green body prior to sintering can raise the green strength as much as 30-40 times, e.g., as high as about 3000 psi (210.9 kg/cm$^2$). The heat-treated green bodies may then have sufficient green strength such that they can be handled and transported into the sintering furnace without substantial deformation, and without the use of a tray.

According to various embodiments, the green body can comprise a unitary (e.g., single, solid) piece, or can be a combination of smaller green bodies arranged as desired to form a shape. For instance, when manufacturing large-scale refractory bodies, it may be advantageous to stack small green bodies on top of each other, or side by side, optionally with the use of compressive force, and to sinter the compiled green bodies into a single solid bonded block, e.g., a block having substantially indistinguishable layers or pieces. The green bodies can be dried and/or heat-treated prior to assembly into a larger combined green body. In the case of bodies stacked on top of each other, a vertical compressive force can be applied by the weight of the bodies themselves, e.g., the force of gravity acting on the stack. In the case of side-by-side green bodies, or any other arrangements, a compressive force can be applied horizontally or in any other direction using mechanical force, such as with a clamp or other device.

Sintering of the green body can take place using any desired thermal cycle appropriate for sintering refractory materials. A single- or multi-stage thermal cycle can be employed with various hold temperatures, ramp rates, and/or residence times. It is within the ability of one skilled in the art to select a thermal cycle suitable to achieve the refractory properties desired for a particular application. Thermal cycles may be designed, for example, to reduce and/or eliminate shrinkage and/or stress during firing. For example, in the case of zirconia, the crystal phase transition occurring between about 1100-1200° C. can cause significant shrinkage, volume change, and/or stress. Depending on various factors, such as green body packing and/or refractory particle size, the green body may shrink as much as 15% during sintering, such as from about 5-14%, or from about 7-12%, or from about 8-10%, including all ranges and subranges therebetween.

Figure 5:
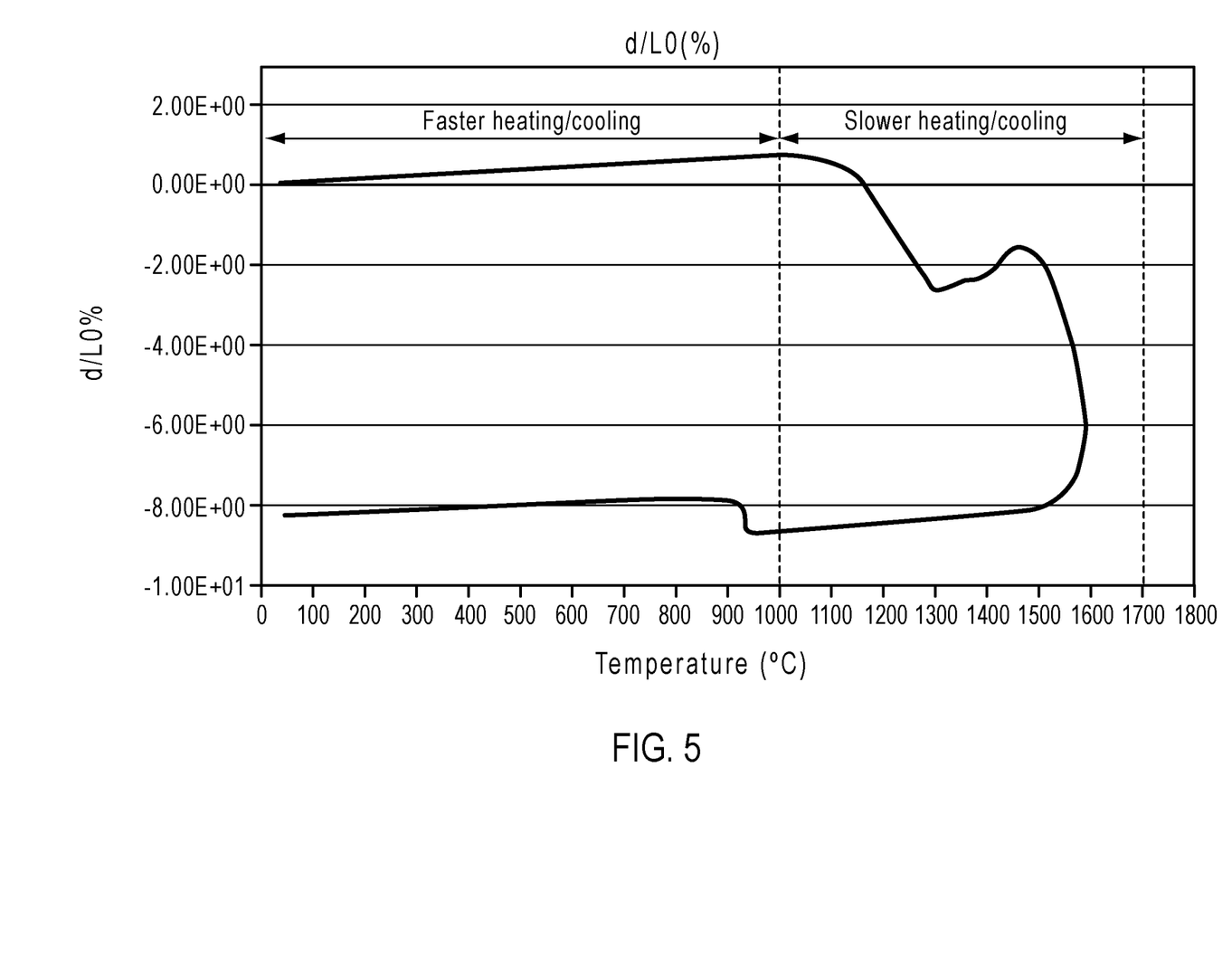
FIG. 5 is a graphical illustration of zirconia shrinkage as a function of heating cycle.

Exemplary pressed green bodies comprising zirconia particles were used to study shrinkage in a dilatometer from room temperature to 1600° C. FIG. 5 shows the results of the test, with shrinkage plotted as a function of the heating cycle (heating ramp rate 1° C./min, 30-minute hold at temperature, cooling ramp rate 1° C./min). From room temperature to about 1000° C., the green body expansion was relatively low. Around 1100° C. the green body began to shrink as the zirconia crystal phase changed from monoclinic to tetragonal. At approximately 1300° C., some expansion occurred as the body length increased. The sintering process began around 1500° C., which can result in further shrinkage of the green body as the glassy phase forms. Without wishing to be bound by theory, it is believed that the relatively short hold time at 1600° C. (30 minutes for the study) was insufficient for complete glass formation, which may explain the continued shrinkage as the piece was cooling down to about 1400° C., at which point the shrinkage more or less leveled off. Slight expansion can be seen around 900-1000° C. as the zirconia crystal phase changed from tetragonal back to monoclinic. Finally, slight shrinkage occurred as the body cooled back down to room temperature.

Based in part on the above results, exemplary thermal cycles can include one or more steps up to a final sintering temperature ranging from about 1400° C. to about 1950° C., such as from about 1450° C. to about 1900° C., from about 1500° C. to about 1850° C., from about 1550° C. to about 1800° C., from about 1600° C. to about 1750° C., or from about 1650° C. to about 1700° C., including all ranges and subranges therebetween. In some embodiments, a first heating stage can comprise heating from room temperature to a first temperature at a first heating ramp rate. The first temperature can range, for example, from about 900° C. to about 1200° C., such as from about 1000° C. to about 1100° C., and can be chosen, for instance, based on a crystal phase transition point of the refractory material and/or any other point at which significant shrinkage begins to occur. The heating ramp rate for the first heating stage can vary as desired and can range, for example, from about 10° C./hr to about 200° C./hr, such as from about 25° C./hr to about 150° C./hr, or from about 50° C./hr to about 100° C./hr, including all ranges and subranges therebetween. In some embodiments, the heating ramp rate to the first temperature can be relatively higher due to lower levels of shrinkage from room temperature to the first temperature and can range, for example, from about 50° C./hr to about 200° C./hr, such as from about 100° C./hr to about 150° C./hr, including all ranges and subranges therebetween.

The thermal cycle can further comprise heating from the first temperature to a second temperature at a second heating ramp rate. The second temperature can range, for example, up to the sintering temperature, such as ranging from about 1400° C. to about 1950° C., including all ranges and subranges provided above. The heating ramp rate for the second heating stage can vary as desired and can range, for example, from about 10° C./hr to about 200° C./hr, such as from about 25° C./hr to about 150° C./hr, or from about 50° C./hr to about 100° C./hr, including all ranges and subranges therebetween. In some embodiments, the heating ramp rate to the second temperature can be relatively lower due to higher levels of shrinkage between the first temperature and the second temperature, and can range, for example, from about 10° C./hr to about 50° C./hr, such as about 25° C./hr. According to various embodiments, the green body can be held at the second temperature (or sintering temperature) for a residence time sufficient to sinter the refractory phase and/or form the glassy phase. The residence time can range, for example, from about 6 hours to about 48 hours, such as from about 12 hours to about 36 hours, or from about 18 hours to about 24 hours, including all ranges and subranges therebetween. Of course, heating the green body to the sintering temperature can take place in more than two steps, such as three or four or more steps, or can comprise a single step, as desired and without limitation.

Cooling of the sintered refractory material can likewise take place in a single step or multiple steps back down to room temperature. According to various embodiments, a first cooling stage can comprise cooling the sintered body to a third temperature at a first cooling rate. The third temperature can range, for example, from about 1100° C. to about 1400° C., such as from about 1200° C. to about 1300° C., including all ranges and subranges therebetween. The cooling ramp rate for the first cooling stage can vary as desired and can range, for example, from about 10° C./hr to about 200° C./hr, such as from about 25° C./hr to about 150° C./hr, or from about 50° C./hr to about 100° C./hr, including all ranges and subranges therebetween. In some embodiments, the cooling ramp rate to the third temperature can be relatively higher due to lower levels of shrinkage and/or expansion between the second temperature and the third temperature. In the case of zirconia refractory materials, the first cooling ramp rate can also be accelerated as desired to reduce or eliminate zircon formation.

Cooling to a fourth temperature can be carried out at a second cooling ramp rate, if desired. The fourth temperature can be chosen, for instance, based on a crystal phase transition point of the refractory material and/or any other point at which significant expansion begins to occur. The fourth temperature can thus range, in some embodiments, from about 900° C. to about 1200° C., such as from about 1000° C. to about 1100° C., including all ranges and subranges therebetween. The cooling ramp rate for the second cooling stage can vary as desired and can range, for example, from about 10° C./min to about 200° C./hr, such as from about 25° C./hr to about 150° C./hr, or from about 50° C./hr to about 100° C./hr, including all ranges and subranges therebetween. The second cooling rate can, in some embodiments, be relatively lower due to higher levels of expansion between the third temperature and the fourth temperature.

A third or final cooling stage can be employed to cool the sintered refractory from the fourth temperature to room temperature. The cooling ramp rate for the third cooling stage can vary as desired and can range, for example, from about 10° C./hr to about 200° C./hr, such as from about 25° C./hr to about 150° C./hr, or from about 50° C./hr to about 100° C./hr, including all ranges and subranges therebetween. According to various embodiments, the third cooling rate can be relatively higher due to lower levels of shrinkage and/or expansion from the fourth temperature to room temperature. Of course, cooling the sintered body to room temperature can take place in more or less than three steps, such as two, three or four or more steps, or can comprise a single step, as desired and without limitation.

An exemplary and non-limiting thermal cycle is illustrated in Table I below solely for purposes of further illustrating certain aspects of the disclosure.

TABLE I

Exemplary Thermal Sintering Cycle

| Phase | Temperature | Ramp Rate/Hold Time |
| --- | --- | --- |
| A | 25° C. → 1000° C. | 50° C./hr |
| B | 1000° C. → 1700° C. | 25° C./hr |
| C | 1700° C. | 6-48 hours |
| D | 1700° C. → 1300° C. | 25-200° C./hr |
| E | 1300° C. → 1000° C. | 25° C./hr |
| F | 1000° C. → 25° C. | 50° C./hr |

After cooling, the sintered refractory material can optionally be further processed according to any known methods in the art. For example, the sintered body can be machined to achieve a specific shape, smoothed, finished, and/or cleaned, to name a few optional processes. The final bonded refractory body can be used to construct all or a portion of a high-temperature vessel, such as a melting furnace and the like. In certain embodiments, a melting vessel can comprise at least one interior surface comprising the sintered zirconia refractory material.

Sintered zirconia refractory materials according to the disclosure can comprise at least about 80% by weight of zirconia grains having an average grain size of 100 microns or less, interspersed in a glassy phase comprising less than about 20% of the total weight of the sintered refractory material. The glassy phase of the sintered refractory material can comprise glassy phase components as discussed above with respect to the method (e.g., alumina, silica, boron oxide, alkali and alkaline earth metal oxides, etc.) in any combination of concentrations as set forth herein. For instance, in some embodiments, a sintered zirconia refractory material can comprise from about 4% to about 18% by weight of silica (such as about 4, 5, 6, 7, 8, 9, 10, 11, 12, 13, 14, 15, 16, 17, or 18%), from about 0% to about 8% by weight of alumina (such as about 0.25, 0.5, 1, 2, 3, 4, 5, 6, 7, or 8%), from about 0% to about 8% by weight of boron oxide (such as about 0.25, 0.5, 1, 2, 3, 4, 5, 6, 7, or 8%), from about 0% to about 4% by weight of alkali or alkaline earth metal oxides (such as about 0.25, 0.5, 1, 2, 3, or 4%), from about 0-2% by weight of titania (such as about 0.25, 0.5, 0.75, 1, 1.25, 1.5, 1.75, or 2%), and from about 0-8% by weight of phosphorous oxide $P_2O_5$ (such as from about 1, 2, 3, 4, 5, 6, 7, or 8%), including all ranges and subranges therebetween.

According to certain embodiments, the sintered zirconia refractory material can comprise from about 4-10% by weight of silica, from about 0.25-4% by weight of alumina, from about 0.2-4% by weight of boron oxide, from about 0-2% by weight of alkali or alkaline earth metal oxides, from about 0-0.5% by weight of titania, and from about 0-4% by weight of phosphorous oxide. The sintered zirconia refractory material can, in various embodiments, comprise at least about 90% by weight of zirconia, such as at least about 95% by weight of zirconia, or at least about 96% by weight of zirconia, and the zirconia can have an average grain size of about 100 microns or less, such as ranging from about 10 microns to about 80 microns, from about 20 microns to about 70 microns, from about 30 microns to about 60 microns, or from about 40 microns to about 50 microns, including all ranges and subranges therebetween.

In non-limiting embodiments, the sintered zirconia refractory materials produced according to the disclosure can be homogeneous or substantially homogeneous. As used herein the terms "homogeneous," "substantially homogeneous" and variations thereof with reference to sintered refractory materials are intended to denote that the material exhibit physical and/or chemical homogeneity across a length scale approximately equal to one of its dimensions, e.g., diameter, length, width, and/or thickness. For instance, for an exemplary refractory material having a length of 10 cm, the material may be described as substantially homogeneous across a length scale approximately equal to 10 cm. Likewise, materials having a dimension ranging from about 20 cm to about 150 cm may be homogeneous across a length scale ranging from about 20 cm to about 150 cm. For instance, homogeneity can be measured as the distribution of zirconia particle sizes across a given sample dimension. Thus, a refractory material with a substantially homogenous grain microstructure may have little or no variation in the grain size across a given dimension, such as less than about 10% variation, less than about 5% variation, less than about 3% variation, less than about 2% variation, or less than about 1% variation in grain size.

As compared to fused cast refractories, which can comprise larger grains at the center of the material and smaller grains at the surface, the sintered refractory materials disclosed herein can exhibit a substantial homogeneity, such that the grain size does not vary, or does not substantially vary across the material along a given dimension (e.g., thickness, length, width, etc.). In certain embodiments, a bulk zirconia grain size (e.g., an average taken for multiple zirconia grains at a given location, e.g., 5, 10, 20, 50, or 100 grains) located on a surface of the refractory material may be substantially equal to a bulk zirconia grain size located in a central region of the refractory material. For example, the bulk zirconia grain size values may be within about 10%, within about 5%, within about 3%, within about 2%, or within about 1% of each other. According to additional embodiments, a bulk zirconia grain size located on a surface of the material may be substantially equal to a bulk zirconia grain size located at a depth of about 10%, 20%, 30%, 40%, or 50% of the refractory material.

The methods and sintered refractory materials disclosed herein may provide one or more advantages over prior art methods and fused cast refractory materials. In certain embodiments, sintered refractory materials as disclosed herein may have properties comparable to that of fused cast zirconia, e.g., in terms of corrosion rate, specific gravity, porosity, electrical resistivity, and/or thermal conductivity, while also offering various advantages not provided by fused cast zirconia. For example, sintered zirconia can have a more uniform grain size distribution and/or a finer grain size, which can result in a lower defect rate and/or product yield loss as compared to fused cast zirconia.

Additionally, unlike fused cast zirconia, which can be gray in color due to the presence of reduced species in the material, sintered zirconia can be fully or substantially oxidized such that the material has a cream to light-brownish color. Thus, while fused cast zirconia can change color and oxidation states during an initial period after installation in the vessel (e.g., a couple months), the sintered zirconia may not need to further react to achieve a fully oxidized state, thereby potentially shortening the vessel heat-up cycle time. Moreover, methods for making bonded refractory materials according to the disclosure may be more cost-efficient and/or less complex as compared to methods for making fused cast zirconia. Of course, it is to be understood that the methods and materials disclosed herein may not have one or more of the above advantages, but are intended to fall within the scope of the appended claims.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a precursor" includes examples having two or more such precursors unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. Moreover, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method that comprises A+B+C include embodiments where a method consists of A+B+C and embodiments where a method consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

Refractory Materials

Zirconia refractory materials were prepared by mixing the precursor compositions listed in Table II below according to the following protocol. Deionized (DI) water (11.5 wt % super-addition) and alumina were added to a bowl and mixed for 10 minutes to form a slurry. Boric oxide was added to the slurry, followed by an additional 10 minutes of mixing. Silica soot was added to the slurry, followed by an additional 10 minutes of mixing. Nitric acid (50:50 $HNO_3$ diluted with DI water) was added to bring the pH of the slurry to approximately 3.5. Zirconia was added to the slurry with continuous mixing until the zirconia was uniformly distributed. The batch composition was observed to be slightly sticky, which may have been due to the presence of hydrated alumina and fine silica soot in the mixture.

TABLE II

Precursor Materials

| | Compositions | | | | | | | | |
|---|---|---|---|---|---|---|---|---|---|
| Material precusors | SAB-100 Material wt. % | SAB-101 Material wt. % | SAB-102 Material wt. % | SAB-103 Material wt. % | SAB-104 Material wt. % | SAB-105 Material wt. % | SAB-106 Material wt. % | SAB-107 Material wt. % | SAB-108 Material wt. % |
| Zinconium(IV) oxide | 94.02 | 94.19 | 93.74 | 93.82 | 93.31 | 93.04 | 92.57 | 93.57 | 93.14 |
| Silica (soot from Wilmington); Fumed silica, | 5.04 | 5.06 | 5.04 | 5.04 | 5.02 | 5.00 | 4.98 | 5.03 | 5.01 |
| Aluminum oxyhydroxide (Dispal 14N480, Alumina, Boehmite;) | 0.94 | 0.41 | 0.87 | 0.43 | 0.92 | 0.93 | 0.99 | 0.44 | 0.48 |
| Boric oxide (0.9869 B2O3) - | 0.00 | 0.33 | 0.35 | 0.70 | 0.75 | 1.03 | 1.47 | 0.96 | 1.38 |
| Total | 100.00 | 100 | 100 | 100 | 100 | 100 | 100 | 100 | 100 |

Various green bodies of different shapes and sizes were prepared from the above batch compositions and sintered according to varying thermal schedules. Table III lists some exemplary sintered refractory compositions formed from the above precursor materials (SAB-100 and SAB-104) as well as from other precursor compositions comprising various amounts of potassium oxide as an additional oxide (SAB-122-127).

TABLE III

Exemplary Refractory Compositions

| | Weight % | | | | | | | |
|---|---|---|---|---|---|---|---|---|
| Oxide | SAB-100 | SAB-104 | SAB-122 | SAB-123 | SAB-124 | SAB-125 | SAB-126 | SAB-127 |
| $ZrO_2$ | 94.20 | 93.48 | 92.00 | 90.70 | 86.80 | 92.60 | 94.00 | 92.00 |
| $SiO_2$ | 5.05 | 5.02 | 6.50 | 6.50 | 11.50 | 5.50 | | 6.88 |
| $Al_2O_3$ | 0.75 | 0.74 | 0.80 | 1.00 | 0.55 | 0.41 | | 0.80 |
| $B_2O_3$ | | 0.75 | 0.40 | 0.20 | 0.60 | 0.50 | | 0.20 |
| $K_2O$ | | | 0.40 | 0.40 | 0.10 | 0.05 | | 0.12 |
| Total | 100.00 | 100.00 | 100.10 | 98.80 | 99.55 | 99.06 | 100.00 | 100.00 |
| % Glassy Phase | 5.80 | 6.52 | 8.10 | 8.10 | 12.75 | 6.46 | 6.00 | 8.00 |

Pre-Treatment

Figure 6:
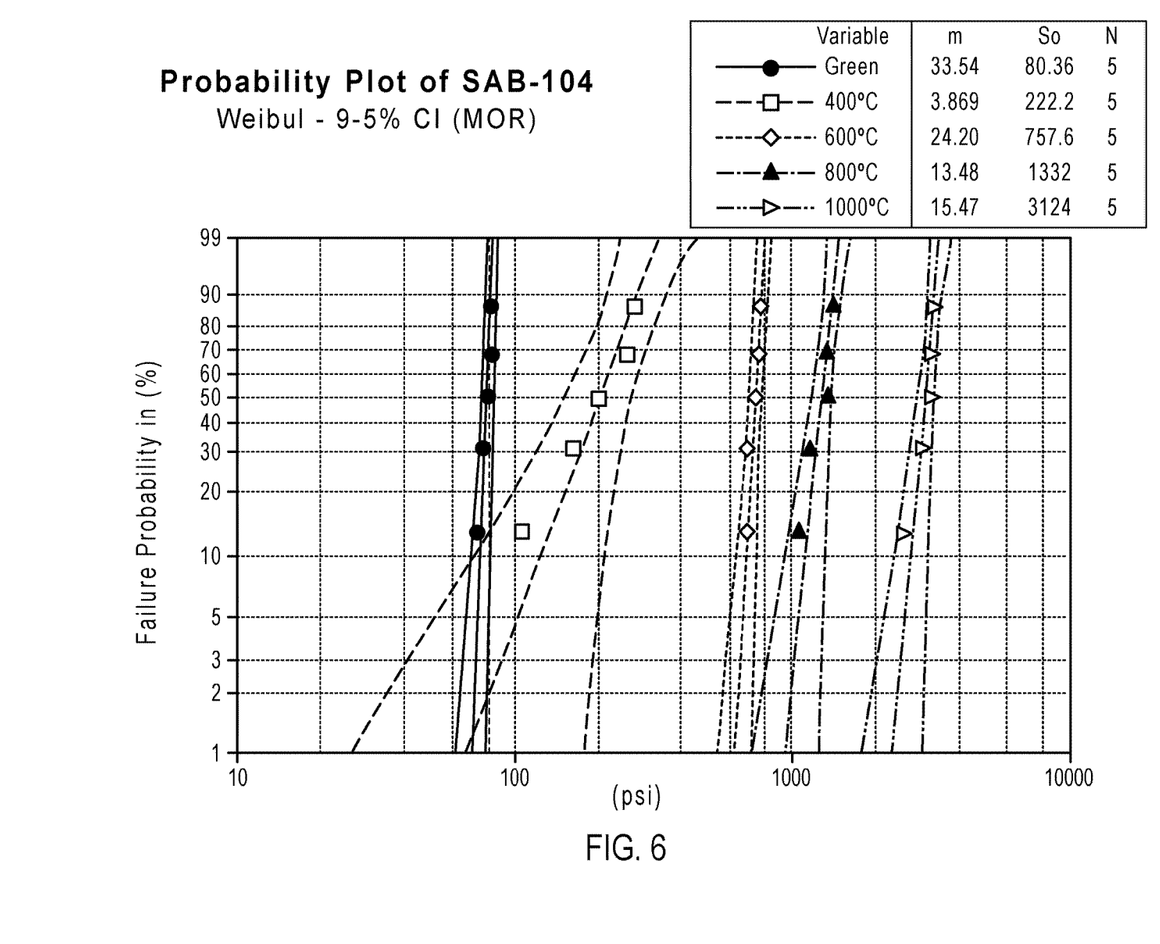
FIG. 6 is a Weibull plot of MOR as a function of pre-treatment temperature for exemplary bonded zirconia according to embodiments of the disclosure.

Green pressed bars of composition SAB-104 were prepared according to the following protocol. The batch composition was dried in an oven from room temperature to 40-80° C. to remove moisture from the batch before pressing. The dried batch material was powdered and sieved through a 100 mesh sieve. Dies were placed directly onto an alumina tray (with a thin layer of zirconia powder rubbed on the surface). Powder was added and uni-axially pressed onto the alumina tray. Pre-treatment of the green bars was carried out by firing at various temperatures (400° C., 600° C., 800° C., 1000° C.) and the modulus of rupture (MOR) of these samples was charted in the Weibull probability plot illustrated in FIG. 6. Whereas the green body without pre-treatment exhibits an MOR of about 80 psi, the MOR goes up as a function of the pre-treatment temperature, reaching as high as about 3120 psi for pre-treatment as 1000° C.

Corrosion Resistance

Figure 7A:
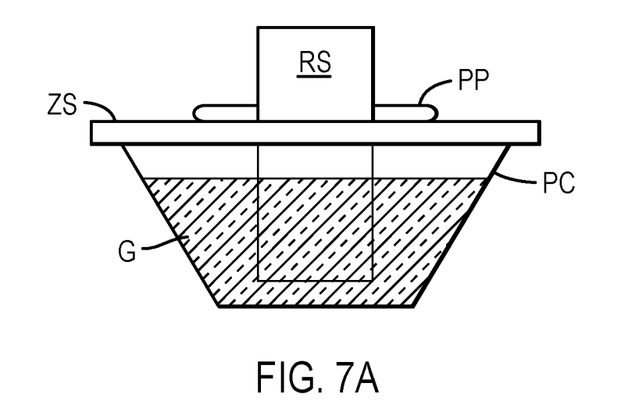
FIG. 7A-B are schematics illustrating an exemplary static corrosion test protocol.

The resistance of zirconia refractory materials to corrosion was tested according to the following test protocol, including bonded samples produced per the protocol above and commercially available fused cast zirconia samples. The experimental setup for static corrosion testing is illustrated in FIG. 7A. Each refractory sample RS was ground to 300 grit and suspended with a platinum pin PP and fused zirconia collar ZC over a platinum crucible PC (200 cc). The crucible and refractory sample were separately placed in a furnace and preheated to 1660° C. at a ramp rate of 100° C./hr. 500 grams of glass cullet were placed inside the crucible to pre-melt the glass. Three different glass types were tested, including Corning EAGLE XG®. After a sufficient soak time, the refractory sample was placed in the center of the crucible and allowed to soak at temperature for 3 days. Dynamic corrosion testing was carried out in a similar fashion, but with four samples suspended in a crucible and with constant rotation to move the refractory samples through the molten glass to simulate flow.

Figure 7B:
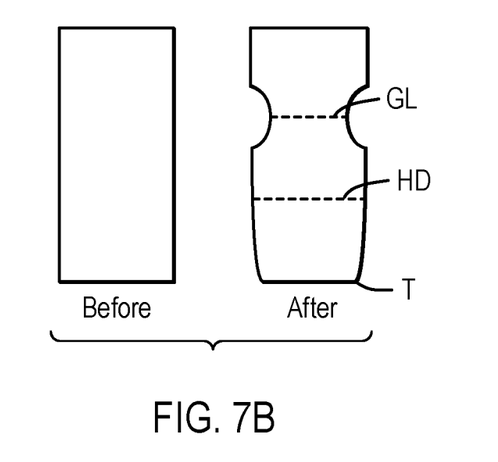

FIG. 7B illustrates a wear profile for the refractory sample before and after testing. After the soak period, the formerly rod-shaped samples are worn at various points along the sample. Wear at the glass line GL (or melt line ML) and at the half down HD mark was analyzed for each sample. Wear can also occur at the sample tip T, but was not measured. Static corrosion test results are presented in Table IV. Static corrosion tests performed at 1700° C. for three days using EAGLE XG® glass are presented in Table V. Additional static and dynamic corrosion test results are presented in Table VI.

TABLE IV

Static Corrosion Resistance

| | | | | Total Loss | | Corrosion Rate | |
| | | | | | | ML | HD |
| Temp. | Glass | Material | Time (days) | ML (mm) | HD (mm) | (mm/day) | (mm/day) |
|---|---|---|---|---|---|---|---|
| 1662° C. | Eagle XG | Sintered Zr | 3 | −0.52 | −0.57 | −0.17 | −0.19 |
| | | Sintered Zr | | −1.11 | −0.87 | −0.37 | −0.29 |
| | | Scimos CZ | | −1.19 | −0.81 | −0.40 | −0.27 |
| | | Scimos CZ | | −1.27 | −0.69 | −0.42 | −0.23 |
| | | Extruded Zr | | −1.01 | −0.55 | −0.37 | −0.18 |
| 1666° C. | 2316 | Extruded Zr | 3 | −1.41 | −0.34 | −0.47 | −0.11 |
| | | Sintered Zr | | −1.03 | −0.35 | −0.34 | −0.12 |
| | | Extruded Zr | | −1.74 | −0.14 | −0.58 | −0.05 |
| 1715° C. | 2319 | Sintered Zr | 3 | −0.64 | 0.05 | −0.21 | 0.02 |
| | | Sintered Zr | | −1.07 | 0.05 | −0.36 | 0.02 |
| | | Extruded Zr | | −0.38 | 0.25 | −0.13 | 0.08 |

TABLE V

Static Corrosion Resistance

| | Refractory (comments) | Composition Code | Ramp Rate (° C./hr) | ML (mm/day) | HD (mm/day) |
|---|---|---|---|---|---|
| Standard compositions SAB-104 | Size (0.75' × 0.75" × 5") | SAB-104 | >100 | 0.7 | 0.36 |
| | Size (0.75' × 0.75" × 5") | SAB-104-R | >100 | 0.64 | 0.38 |
| | Size (0.75' × 0.75" × 5") | SAB-104-25C | 25 | 0.62 | 0.37 |
| | Bulk center of block | SAB-104-bulk | >100 | 0.66 | 0.39 |
| | SCIMOS CZ | SCIMOS CZ | N/A | 0.68 ± 0.16 | 0.42 ± 0.12 |
| Glassy phase wt % variation | Std 6.5 wt % glass | SAB-104 | >100 | 0.7 | 0.36 |
| | 7.5 wt % glass | SAB-120-100 | >100 | 0.67 | 0.38 |
| | 10 wt % glass | SAB-121-110 | >100 | 0.77 | 0.41 |
| | SCIMOS CZ | SCIMOS CZ | N/A | 0.68 ± 0.16 | 0.42 ± 0.12 |
| Uniaxial pressing pressure | Std 6.5 wt % glass | SAB-104 | >100 | 0.7 | 0.36 |
| | Std (0 psi) | 434-104-0 | >100 | 0.72 | 0.39 |
| | Std (700 psi) | 434-104-700 | >100 | 0.75 | 0.40 |
| | Std (15000 psi) | 434-104-15000 | >100 | 0.71 | 0.39 |
| | SCIMOS CZ | SCIMOS CZ | N/A | 0.68 ± 0.16 | 0.42 ± 0.12 |
| Boron content | Std 6.5 wt % glass | SAB-104 | >100 | 0.7 | 0.36 |
| | Low boron | SAB-102 | >100 | 0.81 | 0.54 |
| | No boron added | SAB-100-25C | 25 | 0.6 | 0.35 |
| | SCIMOS CZ | SCIMOS CZ | N/A | 0.68 ± 0.16 | 0.42 ± 0.12 |
| Alternate zirconia source | Zircoa fine grain Zr | SAB-104 | >100 | 0.7 | 0.36 |
| | CS-10 | CS10-SAB-304 | >100 | 0.62 | 0.37 |
| | Alternate-Saint Gobain | CC10-SAB-204 | >100 | 0.61 | 0.38 |
| | SCIMOS CZ | SCIMOS CZ | N/A | 0.68 ± 0.16 | 0.42 ± 0.12 |
| Alkali addition | Std 6.5 wt % glass | SAB-104 | >100 | 0.7 | 0.36 |
| | 0.1 wt % $K_2O$ | SAB-124-R | >100 | Untested | Untested |
| | 0.1 wt % $K_2O$ | SAB-124-25C | 25 | 0.64 | 0.35 |
| | 0.12 wt % $K_2O$ | SAB-127-R | >100 | 0.62 | 0.34 |
| | 0.12 wt % $K_2O$ | SAB-127-25C | 25 | 0.61 | 0.35 |
| | 0.4 wt % $K_2O$ | SAB-123-R | >100 | 0.75 | 0.41 |
| | 0.4 wt % $K_2O$ | SAB-123-25C | 25 | 0.71 | 0.56 |
| | SCIMOS CZ | SCIMOS CZ | N/A | 0.68 ± 0.16 | 0.42 ± 0.12 |

TABLE VI

Static and Dynamic Corrosion Resistance

| Refractory | Test | Glass | Temp (° C.) | RPM | ML (mm/day) ±0.05 mm/day | HD (mm/day) ±0.05 mm/day |
|---|---|---|---|---|---|---|
| 101 | Static | EAGLE XG | 1662 | N/A | −0.43 | −0.24 |
| 104 | Static | EAGLE XG | 1662 | N/A | −0.43 | −0.20 |
| 112 | Static | EAGLE XG | 1662 | N/A | −0.42 | −0.21 |
| 117 | Static | EAGLE XG | 1662 | N/A | — | — |
| 118 | Static | EAGLE XG | 1662 | N/A | −0.40 | −0.22 |
| 119 | Static | EAGLE XG | 1662 | N/A | −0.43 | −0.21 |
| 295 | Static | EAGLE XG | 1662 | N/A | — | — |
| 296 | Static | EAGLE XG | 1662 | N/A | — | — |
| CZ | Static | EAGLE XG | 1662 | N/A | −0.38 | −0.18 |
| CZ | Static | EAGLE XG | 1662 | N/A | −0.34 | −0.22 |
| CZ | Static | EAGLE XG | 1662 | N/A | −0.41 | −0.25 |
| 104 | Static | 2318 | 1666 | N/A | −0.65 | −0.17 |
| CZ | Static | 2318 | 1666 | N/A | −0.64 | −0.19 |
| 104 | Static | 2319 | 1715 | N/A | −0.45 | −0.15 |
| CZ | Static | 2319 | 1715 | N/A | −0.48 | −0.16 |
| 104 | Dynamic | EAGLE XG | 1625 | 1.2 | −0.27 | −0.27 |
| 117 | Dynamic | EAGLE XG | 1625 | 1.2 | −0.30 | −0.33 |
| 119 | Dynamic | EAGLE XG | 1625 | 1.2 | −0.24 | −0.27 |
| CZ | Dynamic | EAGLE XG | 1625 | 1.2 | −0.26 | −0.30 |

— indicates the sample did not survive the test conditions
† STD for ML and HD corrosion rates was ~0.03 mm/day (error estimated at ±0.05 mm/day)

As can be appreciated from Tables IV-VI, sintered zirconia refractories produced as described herein exhibited equivalent, or even slightly better, static and dynamic corrosion resistance as compared to the comparative fused cast sample Scimos CZ from Saint-Gobain.

Electrical Resistivity

Bonded zirconia refractory sample blocks (SAB-104, SAB-123, SAB-127) having dimensions 1.25"×1.25"×2.25" were measured for electrical resistivity at 1500° C. and 1600° C. using the 4 wire 60 Hz a/c hot wire technique. The results for this testing are shown in Table VII below, along with historical values for fused cast zirconia products Scimos CZ and MCZ from Saint-Gobain (extrapolated from values for CZ and MCZ at 1540° C. and interpolating between the 1500° C. and 1600° C. data points for the bonded zirconia samples). The results demonstrated that bonded zirconia samples had comparable electrical resistivity to the comparative fused cast zirconia samples.

TABLE VII

Electrical Resistivity

| Refractory | 1500° C. | 1540° C. | 1600° C. |
|---|---|---|---|
| SCIMOS CZ | | 129* | |
| SCIMOS MCZ | | 174* | |
| SAB-104 | 139 | 121** | 94 |
| SAB-123 | 164 | 140** | 105 |
| SAB-122 | 132 | 116** | 92 |

*Historical data
**Interpolated between 1500° C. and 1600° C. data

Additional Testing

Pressed green bodies of SB-104 were sintered according to the schedule set forth in Table I. The performance of the inventive bonded zirconia refractories was evaluated and compared to the commercial fused cast zirconia product from Saint-Gobain, Scimos CZ. Measured properties included stoning, specific gravity, porosity, modulus of rupture (MOR), thermal conductivity, thermal shock, and predicted cost. A summary of these test results is presented in Table VIII below.

TABLE VIII

Bonded Zirconia Refractory Properties

| Property | Comparison to Scimos CZ |
|---|---|
| Stoning | Improved |
| | 10-20 μm defects as compared to 200-500 μm for CZ |
| Specific Gravity | Comparable |
| | 5.25 as compared to 5.3 for CZ |
| Porosity | Comparable |
| | <0.01% as compared to 0.1% for CZ |
| MOR | Comparable |
| | 93 MPa as compared to 90 MPa for CZ |
| Thermal Conductivity (800° C.) | Comparable |
| | 2.5 W/mk as compared to 2.7 W/mk |
| Thermal Shock (1600-700° C.) | Slightly Inferior |
| Cost Modeling | Improved |
| | Bonded: 25% cost advantage (30% material loss; 16% yield loss) |
| | CZ: 10% cost advantage (45% material loss; 60% yield loss) |

CONCLUSIONS

The data presented in Tables III-VII above demonstrate that the inventive bonded zirconia refractory materials prepared according to the instant disclosure perform comparably, if not better, than prior art fused cast zirconia products. The bonded zirconia refractories thus meet performance requirements while also offering a number of additional benefits. For instance, bonded zirconia materials can have a lower defect (stoning) rate due to their finer microstructure, can have a more uniform microstructure, can be more cost effective, can reduce start-up time due to their already oxidized state, and can be easily tailored as necessary to meet process requirements.

What is claimed is:
1. A sintered zirconia refractory material comprising:
   at least about 80% by weight of zirconia having an average grain size of about 100 microns or less, wherein the zirconia is interspersed in a glassy phase; and wherein the sintered refractory material comprises about 20% or less by weight of the glassy phase.

2. The sintered zirconia refractory material of claim 1, wherein the glassy phase comprises at least one oxide chosen from alumina, silica, boron oxide, titania, phosphorous oxide, alkali and alkaline earth oxides, and combinations thereof.

3. The sintered zirconia refractory material of claim 1, wherein the refractory material comprises from about 4-18 wt % silica, from about 0-8% alumina, from about 0-8% boron oxide, from about 0-4% alkali or alkaline earth oxides, from about 0-2% titania, and from about 0-8wt % phosphorous oxide.

4. The sintered zirconia refractory material of claim 1, wherein the refractory material comprises from about 4-10 wt % silica, from about 0.25-4% alumina, from about 0.2-4% boron oxide, from about 0-2% alkali or alkaline earth oxides, from about 0-0.5% titania, and from about 0-4 wt % phosphorous oxide.

5. The sintered zirconia refractory material of claim 1, comprising at least 90% by weight of zirconia.

6. The sintered zirconia refractory material of claim 1, wherein the zirconia has an average grain size ranging from about 10 μm to about 50 μm.

7. A melting vessel having at least one interior surface comprising the sintered zirconia refractory material of claim 1.

* * * * *

UNITED STATES PATENT AND TRADEMARK OFFICE
CERTIFICATE OF CORRECTION

| | | |
|---|---|---|
| PATENT NO. | : 10,407,349 B2 | Page 1 of 1 |
| APPLICATION NO. | : 15/567845 | |
| DATED | : September 10, 2019 | |
| INVENTOR(S) | : Matthew John Dejneka et al. | |

It is certified that error appears in the above-identified patent and that said Letters Patent is hereby corrected as shown below:

On the Title Page

On page 2, in Column 2, other publications, Line 13, delete "Internation" and insert -- International --, therefor.

On page 3, in Column 1, other publications, Line 5, delete "Refracotries" and insert -- Refractories --, therefor.

Signed and Sealed this
Third Day of March, 2020

Andrei Iancu
*Director of the United States Patent and Trademark Office*